(12) United States Patent
Young et al.

(10) Patent No.: US 8,280,242 B2
(45) Date of Patent: Oct. 2, 2012

(54) CAMERA-STEADYING DEVICE (75) Inventors: Stanfield Young, Los Alamitos, CA (US); Boake Paugh, Rancho Cucamonga, CA (US)

(73) Assignee: West Coast Chain Mfg. Co., Ontario, CA (US)

( * ) Notice: Subject to any disclaimer, the term of this patent is extended or adjusted under 35 U.S.C. 154(b) by 0 days.

(21) Appl. No.: 13/224,294

(22) Filed: Sep. 1, 2011

(65) Prior Publication Data

US 2011/0311215 A1 Dec. 22, 2011

Related U.S. Application Data (63) Continuation of application No. 12/754,508, filed on Apr. 5, 2010, now abandoned.

(51) Int. Cl.
G03B 17/00 (2006.01)
G03B 11/00 (2006.01)
A47B 97/00 (2006.01)

(52) U.S. Cl. ........ 396/544; 396/421; 396/423; 396/424; 396/428; 248/500

(58) Field of Classification Search ........... 396/544, 396/55, 419, 421, 424, 428, 423; 248/500
See application file for complete search history.

(56) References Cited

U.S. PATENT DOCUMENTS

| 1,766,090 A | 6/1930 | Worsching |
| 3,317,169 A | 5/1967 | Hendricks |
| 3,447,442 A * | 6/1969 | Miklos ......................... 396/419 |
| 3,450,369 A | 6/1969 | Blanch et al. |
| 3,834,645 A | 9/1974 | Morishige |
| 4,155,636 A | 5/1979 | Reeberg |
| 4,373,824 A | 2/1983 | Olsen |
| 4,417,703 A | 11/1983 | Weinhold |
| 4,596,365 A | 6/1986 | Wang |
| 4,714,184 A | 12/1987 | Young et al. |
| 4,854,522 A | 8/1989 | Brown et al. |
| 4,946,010 A | 8/1990 | DiBono |
| 5,009,022 A | 4/1991 | McCoy |
| 5,174,625 A | 12/1992 | Gothier et al. |
| 5,265,823 A | 11/1993 | Doty |
| 5,509,616 A | 4/1996 | Millen, Jr. et al. |
| 5,535,960 A | 7/1996 | Skowronski et al. |
| 5,645,239 A | 7/1997 | Zwayer et al. |
| 5,738,328 A | 4/1998 | O'Farrill |
| 5,898,472 A | 4/1999 | Oshikawa |
| 6,019,198 A | 2/2000 | Nielsen |
| 6,019,304 A | 2/2000 | Skowronski et al. |
| 6,082,656 A | 7/2000 | Thornton |
| 6,152,395 A | 11/2000 | Corriveau et al. |
| 6,179,238 B1 | 1/2001 | Phillipps |
| 6,199,784 B1 | 3/2001 | Wang et al. |
| 6,199,785 B1 | 3/2001 | Paugh |
| 6,250,578 B1 | 6/2001 | Manda |
| 6,279,682 B1 | 8/2001 | Feathers |

(Continued)

*Primary Examiner* — Rochelle-Ann J Blackman
(74) *Attorney, Agent, or Firm* — Christie, Parker & Hale, LLP (57) ABSTRACT

A portable camera steady device for use with a camera, having a retractable tensile member whose distal end can be stepped on by a user or hooked to her body or clothing. The device has a swivel mounting member providing two independent and generally perpendicular axes of rotation such that the tensile member extends tangentially from the reel and housing whether the camera is used in the landscape or portrait orientation. A switch is provided to control extension and retraction of the tensile member from a biased reel.

20 Claims, 12 Drawing Sheets

U.S. PATENT DOCUMENTS

| | | |
|---|---|---|
| 6,293,485 B1 | 9/2001 | Hollowed |
| 6,324,285 B1 | 11/2001 | Dowsett et al. |
| 6,325,665 B1 | 12/2001 | Chung |
| 6,336,607 B1 | 1/2002 | Perrier |
| 6,439,490 B1 | 8/2002 | Hwang |
| 6,536,697 B2 | 3/2003 | Tsan |
| 6,616,080 B1 | 9/2003 | Edwards et al. |
| 6,679,448 B1 | 1/2004 | Carpenter et al. |
| 6,694,922 B2 | 2/2004 | Walter et al. |
| 6,752,369 B1 | 6/2004 | Cameron |
| 6,808,138 B2 | 10/2004 | Liao |
| 6,813,976 B2 | 11/2004 | Malvini et al. |
| 6,921,040 B2 | 7/2005 | Watari |
| 7,017,846 B2 | 3/2006 | Tsoi et al. |
| 7,104,491 B2 | 9/2006 | Vinding |
| 7,162,899 B2 | 1/2007 | Fawcett et al. |
| 7,182,286 B2 | 2/2007 | Huang |
| 7,210,645 B2 | 5/2007 | Paterson et al. |
| 7,216,665 B1 | 5/2007 | Sims, Jr. |
| 7,251,966 B2 | 8/2007 | Fawcett et al. |
| 7,350,381 B2 | 4/2008 | Fawcett et al. |
| 7,364,109 B2 | 4/2008 | Kuo |
| 7,367,522 B2 | 5/2008 | Chen |
| 7,374,123 B2 | 5/2008 | Han |
| 7,481,086 B2 | 1/2009 | Fawcett et al. |
| 7,497,100 B2 | 3/2009 | Fawcett et al. |
| 7,497,101 B2 | 3/2009 | Fawcett et al. |
| 2001/0035242 A1 | 11/2001 | Hughs et al. |
| 2004/0016840 A1 | 1/2004 | Malvini et al. |
| 2004/0032741 A1 | 2/2004 | Tai |
| 2004/0221430 A1 | 11/2004 | Gould et al. |
| 2007/0264004 A1* | 11/2007 | Daggett ........................ 396/322 |
| 2007/0286595 A1 | 12/2007 | Blockcolsky |
| 2008/0035778 A1 | 2/2008 | Belden et al. |
| 2008/0210802 A1 | 9/2008 | Sumiyashiki |
| 2008/0271683 A1 | 11/2008 | Mitchell |
| 2009/0014574 A1 | 1/2009 | Tollefson |
| 2009/0205380 A1 | 8/2009 | Tollefson |

* cited by examiner

CAMERA-STEADYING DEVICE

CROSS-REFERENCE TO RELATED APPLICATION(S)

This application is a continuation of application Ser. No. 12/754,508, filed Apr. 5, 2010 now abandoned the disclosure of which is incorporated fully herein by reference.

FIELD OF INVENTION

The present invention relates to devices for steadying a camera for improved photographs and images.

BACKGROUND OF THE INVENTION

Tripods for supporting and steadying image recording devices such as photographic, video and movie cameras have been known. More recently, portable steadying devices that can be mounted or attached to a camera and/or worn on the body have been known. Such portable devices typically provide a tensile member that can be lengthened and pulled tautly by the user to help steady the camera. However, many of such prior devices are adapted to be attached to the camera in only one configuration, limiting the orientation of the camera to, for example, the landscape orientation. Thus, if the camera is used in the portrait orientation, these devices are not as useful and can even be damaged with the tensile member being tangled, twisted and weakened. Moreover, many of these prior devices that allow the user to step on a distal end of the tensile member provide no alternatives in the event contact with the ground or the user's shoe is undesirable such as when the ground or shoe is dirty or wet. Furthermore, many of these prior devices provided limited, if any, locking mechanism controlling the extension and/or retraction of the tensile member for purposes of facilitating storing, deployment and adjustment of the tensile member.

Accordingly, it is desirable that a camera-steadying device provides a housing that allows the camera to be used in either the landscape or portrait orientation without damage or premature wear and tear of the tensile member. It is also desirable that the device allows different means by which the deployed tensile member can be anchored. It is also desirable that the device allows varied control over the extension and retraction of the tensile member for storing, deploying and adjusting the deployed length.

SUMMARY OF THE INVENTION

The present invention is directed to a compact and portable camera steadying device that is usable with a camera operating in either the landscape or portrait configuration. In one embodiment, the device includes a housing with a retractable reel providing a tensile member that can be deployed and anchored to a user's body or clothing. The device includes a swivel mounting member that allows the tensile member to be advantageously deployed in a tangential direction relative to the reel and housing whether the camera is operating in the landscape or portrait configuration. The device also includes a swivel tab member that allows a distal end of the tensile member to be stepped on or hooked to the user's clothing including a belt or shoe laces. The device further includes a switch adapted to provide varied control in the extension and retraction of the tensile member.

In a more detailed embodiment, the swivel mounting member provides two independent axes of rotation between the camera and the device such that the camera and device can lie in a common plane for the camera to operate in the landscape orientation, or in perpendicular planes for the camera to operate in the portrait orientation. In either configuration, the tensile member is deployed tangentially from the reel and housing to avoid undue wear and tear on the tensile member.

In another more detailed embodiment, the swivel tab member can lie at an angle ranging between about 0 and 180 degrees relative to the tensile member such that the tab member can be stored compactly in the housing or releasably anchored to the user's foot or clothing without undue wear and tear on the tensile member. In yet another detailed embodiment, the switch of the device is movable between multiple positions, including a release position, a locked position and an extend position by means of a ratchet that can be completely disengaged from the reel, or releasably engaged at one end to prevent any rotation, and engaged at the other end to allow rotation in one direction while preventing rotation in the other direction.

BRIEF DESCRIPTION OF THE DRAWINGS

These and other features and advantages of the present invention will be better understood by reference to the following detailed description when considered in conjunction with the accompanying drawings wherein.

DETAILED DESCRIPTION OF THE INVENTION

FIGS. 1-4 illustrate an embodiment of a camera steadying device 10 that allows a user to help steady a photographic or video camera 12 for taking better and clearer images. The device includes a housing member 14 in which a retractable reel 16 is provided with a tensile member 18 that can be extended for creating a positive tensile force to steady the camera. The housing member includes a switch 20 to at least (1) allow rotation of the retractable reel only in one direction, (2) allow rotation of the retractable reel in both directions, and (3) lock the retractable reel against any rotation. The housing member 14 further includes a swivel mounting member 22 that can be positioned in a locked storage configuration detached from the camera (FIG. 2*a*), or in various deployed configurations attached to the camera 12 in either the portrait orientation (FIG. 2*c*) or landscape orientation (FIG. 2*b*) with minimal stress fatigue on the tensile member 18.

Figure 2A:
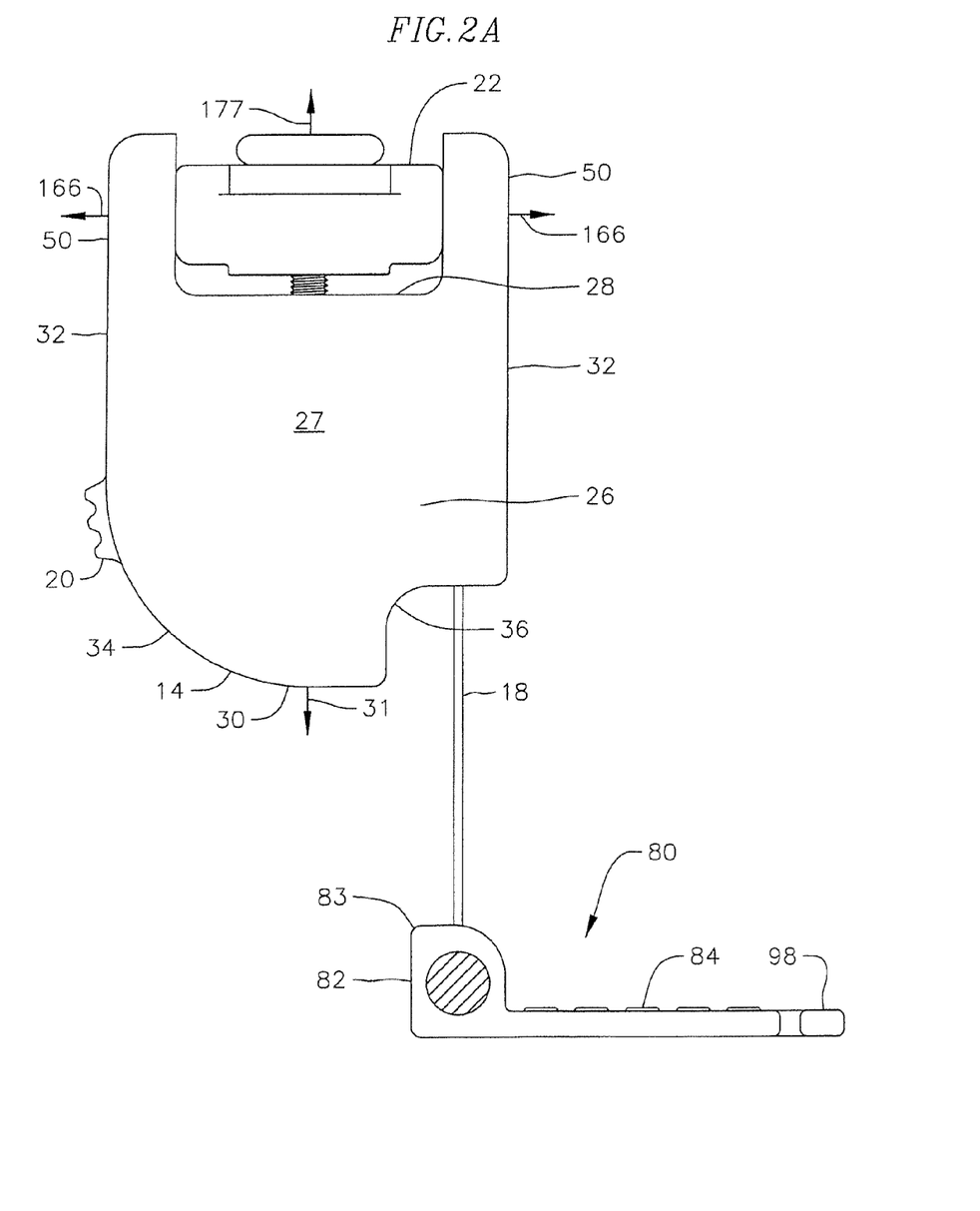
FIG. 2a is a top plan view of an embodiment of the device a swivel mounting member in a stored configuration and a swivel tab member in a deployed configuration.

With reference to FIG. 2*a*, the housing member has a main body portion 26 with a proximal end 28, a distal end 30 along a longitudinal axis 31, and two sides 32 parallel with the axis 31. The main body has a planar, generally rectangular profile defined by two flat surfaces 27. The body has a rounded corner 34 and an indented corner 36 at the distal end 30. The housing member has a length between the ends 28 and 30 ranging between about 3.0 inches and 3.5 inches, preferably about 3.25 inches, a width between the two sides 32 ranging between about 2.0 inches 2.5 inches, preferably about 2.25 inches, and a thickness between the two flat surfaces ranging between about 0.5 and 1.0 inches, preferably about 0.75 inches. The overall size can be comparable to present day pocket-size digital cameras.

With reference to FIGS. 2*b*, 2*c*, 3 and 4, the housing member 14 includes two similar housing halves 14*a* and 14*b* that are generally mirror-images of each other. The housing halves are configured to contact each other along a peripheral edge 40 which when joined form a seam 42 around the device. The first housing half 14*a* has multiple through-holes 43 that are aligned with cylindrical projections 44 formed in the second housing half 14*b*. To releasably fasten the halves 14*a*, 14*b* to each other, screws (not shown) are inserted through the holes 43 and received in the cylindrical projections 44. The switch 20 is located at the rounded corner 34 of the distal end 30, and the tensile member 18 exits the interior of the housing via a slot opening 48 (FIG. 2*d*) formed in the indented corner 36 of the distal end. At the proximal end of the housing member are two opposing arms 50 that extend tangentially from the sides 32. Extending between the arms 50 is the swivel mounting member 22.

Figure 3A:
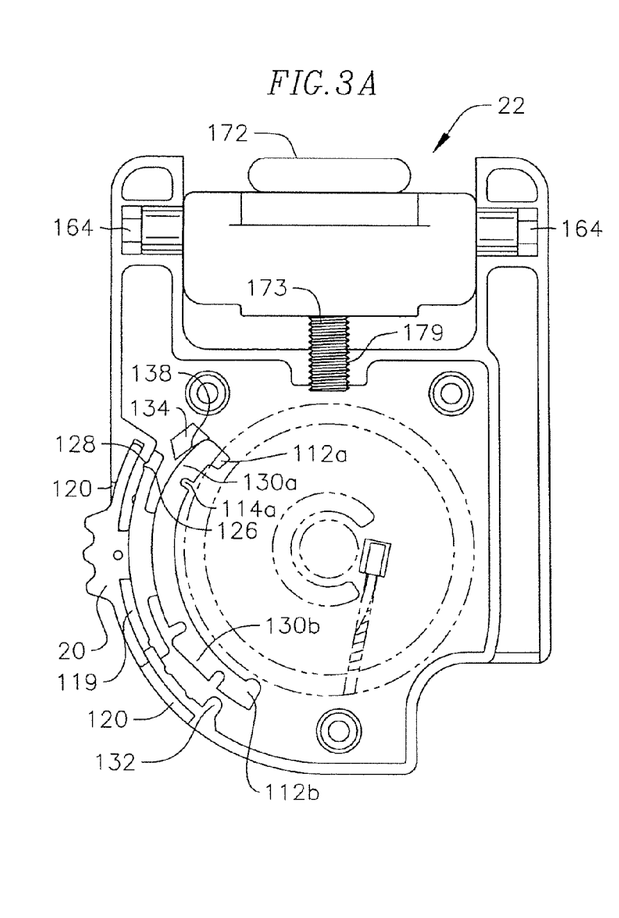
FIG. 3a is a top plan view of an embodiment of a first housing half of the device, a swivel mounting member, and a switch in a "locked" position.
Figure 3B:
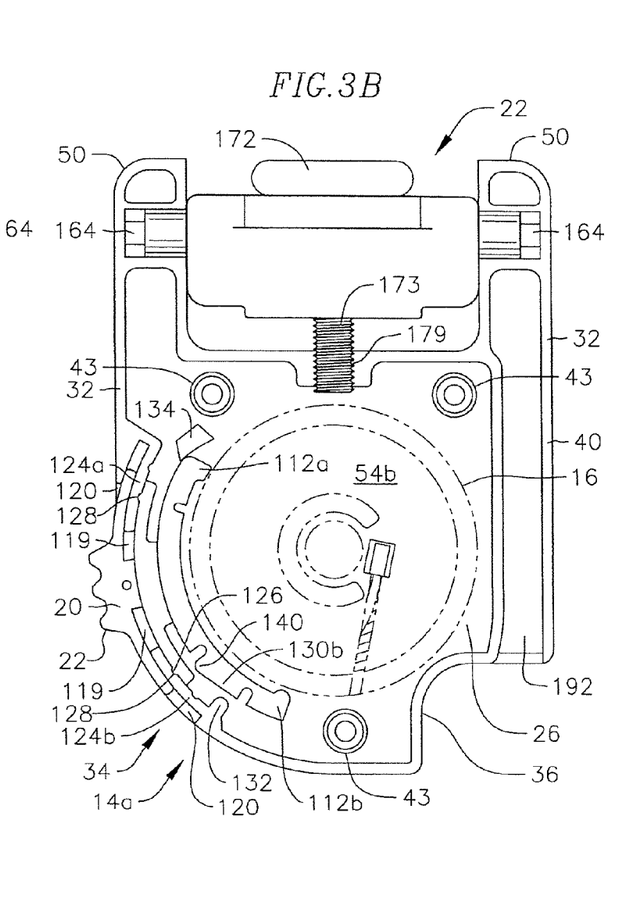
FIG. 3b is a top plan view of the housing of FIG. 3a wherein the switch is in a "release" position.
Figure 3C:
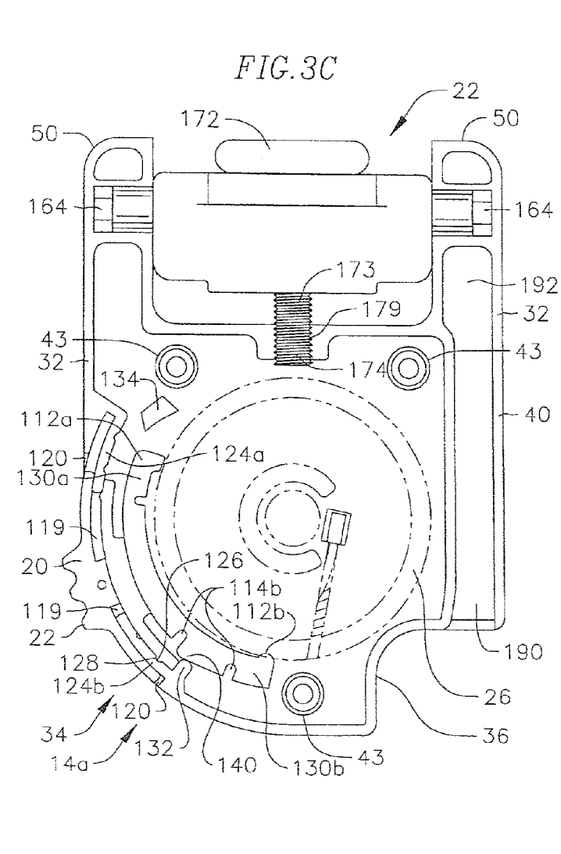
FIG. 3c is a top plan view of the housing of FIG. 3a wherein the switch is in an "extend" position.
Figure 4:
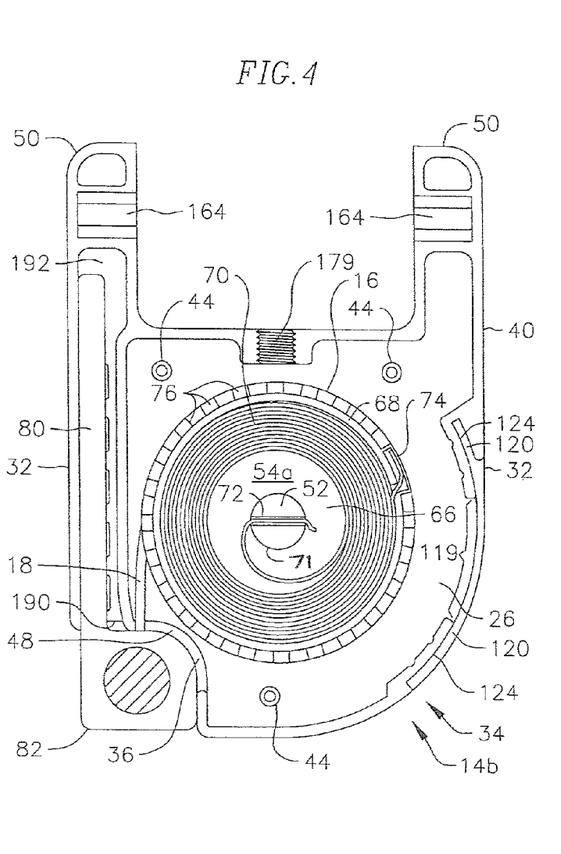
FIG. 4 is a top plan view of an embodiment of a second housing half of the device, including a reel, and a swivel tab member in a stored configuration.

Turning to the interior of the housing 14 as shown in FIGS. 3*c* and 4, the tensile member 18 is wound on the reel 16 which has a central opening 71 that receives a central axis member 52 projecting perpendicularly from an inner surface of the second housing half 14*b* toward the first housing half 14*a*. The reel 16 is thus mounted on the central axis member 52 such that it can rotate about the central axis in a clockwise or counter clockwise direction. The reel has a first side 54*a* that faces the first housing half 14*a* and a second side 54*b* that faces the second housing half 14*b*.

As shown in FIG. 4, the first side 54*a* that faces the first housing half 14*a* has an inner annular space 66 spanning between the axis member 52 and a circumferential wall 68 at a periphery of the first side 54*a* of the reel. The annular space 66 is occupied by a spring coil 70 to bias the reel to rotate in a retraction direction that wounds the tensile member 18 in a channel 56 (FIG. 5) of the reel 16. An inner end of the coil 70 is anchored in a slot 72 in the central axis member 52. An outer end of the coil 70 is anchored in a slot 74 formed on the first side 54*a* in the reel 16. On an outer surface of the wall 68 are a plurality of circumferential cogs 76 that interact with the switch 20, as explained further below.

Figure 5:
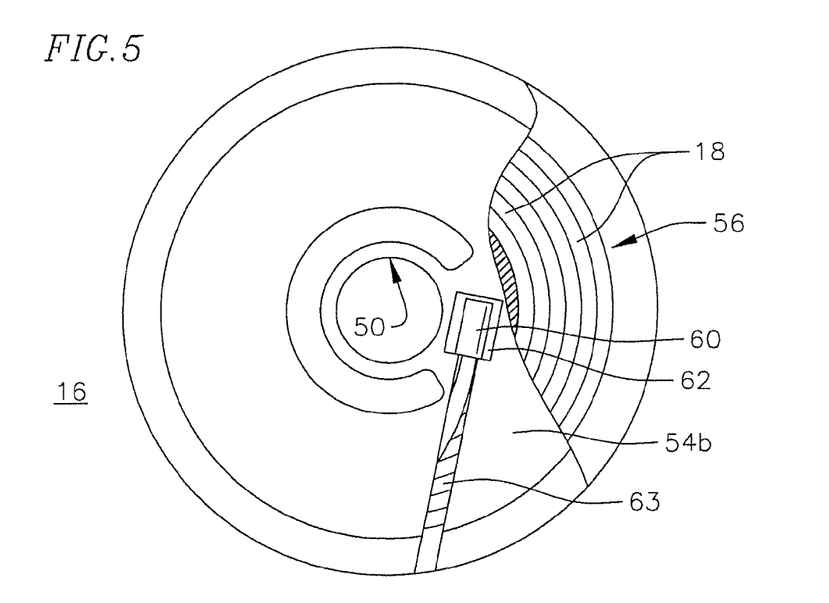
FIG. 5 is a top plan view of an embodiment of a reel.

With reference to FIG. 5, between the first and second sides 54*a*, 54*b* and adjacent the second side 54*b* is a circumferential channel 56 of the reel in which the tensile member 18 is wound. An inner or proximal end of the tensile member is anchored in an end cap 60 that sits in a recess 62 formed on second side 54*b* of the reel. A cutout 63 is formed in the second side 54*b* of the reel to allow the tensile member 18 to extend between the channel 56 and the recess 62.

Figure 1:
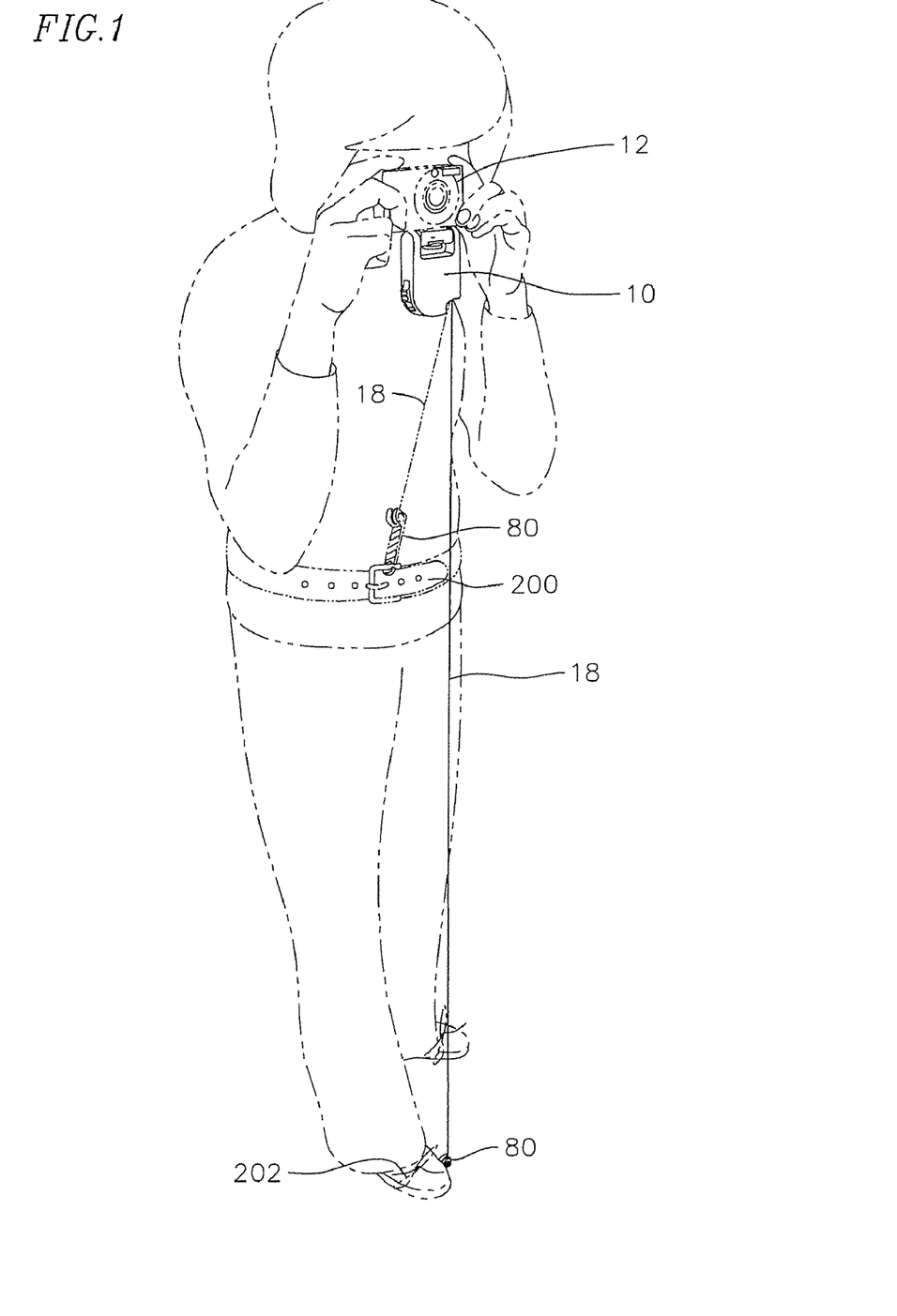
FIG. 1 is a perspective view of an embodiment of a camera-steadying device in accordance with the present invention.
Figure 6:
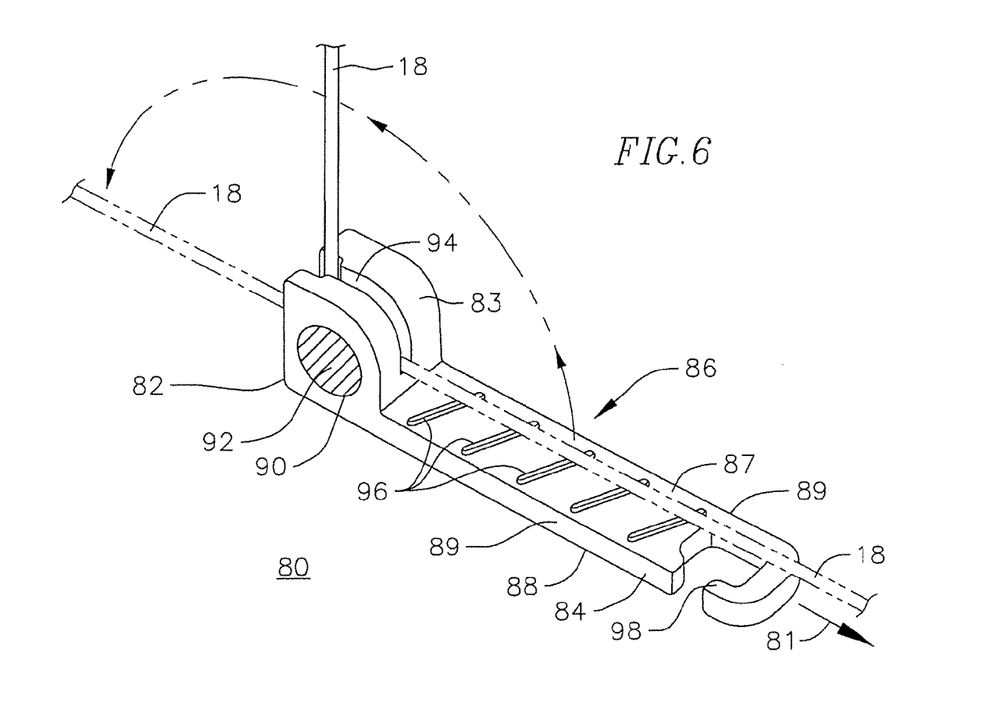
FIG. 6 is a perspective view of an embodiment of a swivel tab member.

As understood by one of ordinary skill in the art, the tensile member 18 (e.g., a cable, chain, cord or monofilament) is adapted to unwind from the reel 16 and extend outside of the housing member 14 through the slot opening 48 when a distal end of the tensile member is drawn by the user with sufficient force to overcome the biasing retraction force of the spring coil 70. When the distal end is released by the user, the tensile member 18 rewinds on the reel 16 under the biasing force of the spring coil 70. With reference to FIGS. 1 and 6, a distal end of the tensile member 16 is equipped with a swivel tab member 80 configured advantageously for the user to step on or to hook on to her clothing. In the disclosed embodiment, the tab member is somewhat L-shaped and has an elongated, generally rectangular body defining a longitudinal axis 81. The tab member has a tethered proximal end 82, a distal end 84 and a planar main portion 86 therebetween with a top surface 87, a bottom surface 88 and two side edges 89. The proximal end 82 has an enlarged portion 83 which extends from top surface 87. The enlarged portion is formed with a through-hole 90 generally perpendicular to the longitudinal axis 81. The hole 90 receives ends of a cylindrical fitting 92 in which the distal end of the tensile member 18 is anchored. The cylindrical fitting 92 is configured for rotational movement in the hole 90 relative to the tab member 80 about an axis generally perpendicular to the axis 81. A slot 94 aligned with the longitudinal axis 81 is provided in the enlarged portion 83 to accommodate the tensile member 18 and allow the tensile member a range of swivel motion with the tab member 80, for example, ranging between about 0 degree adjacent the tab member (broken lines) to 90 degrees perpendicular with the tab member (solid lines) and to 180 degrees opposite of the tab member (broken lines). This range of motion allows the tab member 80 to be stored in the housing member 14 (see FIG. 2*b*) and deployed outside of the housing member (FIG. 2*a*) with minimal stress on the tensile member 18, especially at or near its distal end anchored in the fitting 92 within the tab member 80. This range of motion also allows the user to laterally sweep or otherwise move the camera from side to side without stressing the tensile member along its extended length or at or near the fitting.

The main portion 86 of the tab member 80 is generally flat so that it can be comfortably and effectively stepped on by a foot of the user when the tab member is deployed. To that end, the top surface 87 has a friction-inducing surface, such as a surface with traction ridges 96 so the tab member 80 does not easily slide out from under the user's foot as the user pulls the tensile member taut in providing positive tension to steady the camera. And, where it is not suitable for the user to step on the tab member 80, such as when the user's shoe or foot or a ground surface is wet or dirty, the tab member can be advantageously coupled to the user's body and clothing, including a belt 200 or shoe laces 202 (FIG. 1), by means of an open hook formation 98 at the distal end.

Figure 7:
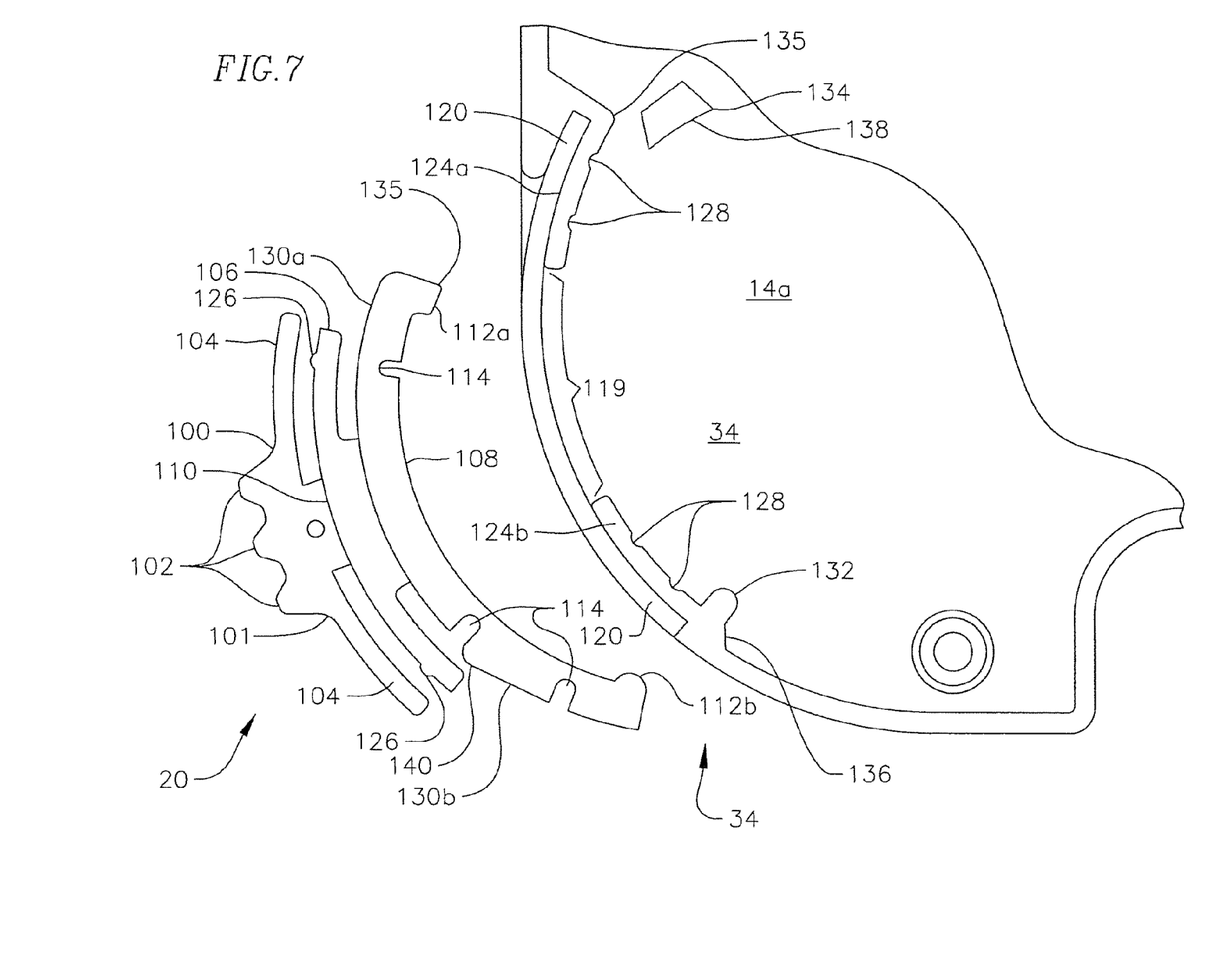
FIG. 7 is a top plan view of an embodiment of a switch detached from a rounded corner of the first housing half.
Figure 8:
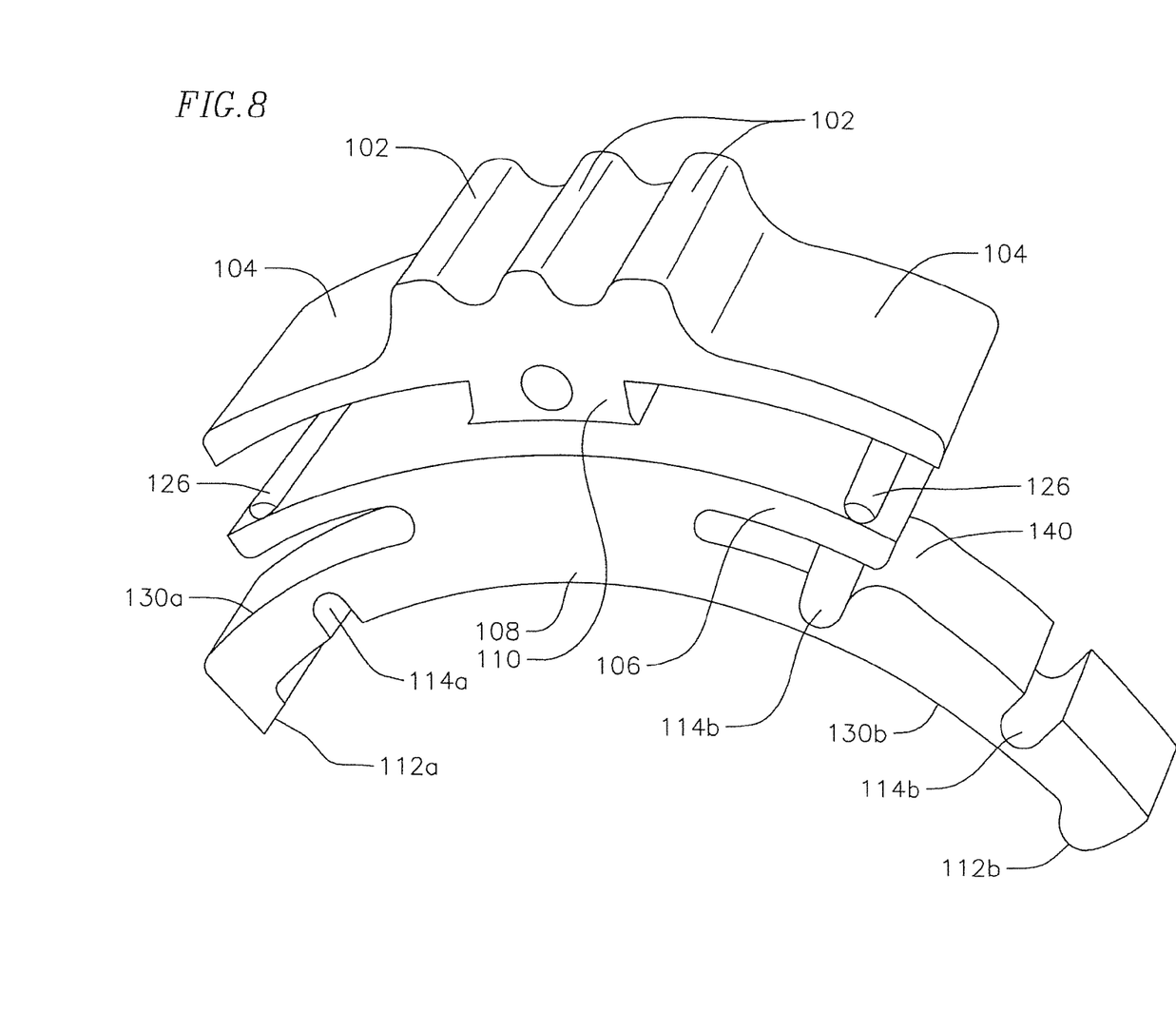
FIG. 8 is a perspective view of an embodiment of the switch.

Turning to the switch 20 of the device 10, the switch is better shown in FIGS. 7 and 8. The switch can lock the reel against retraction or extension (FIG. 3*a*), release the reel for retraction and extension (FIG. 3*b*), or allow extension while locking the reel against retraction (FIG. 3*c*). That is, the switch is slidable between three positions for controlling the extension of the tensile member, namely, (1) a locked position (FIG. 3*a*), (2) a release position (FIG. 3*b*), and (3) an extend position (FIG. 3*c*). As shown in the embodiment of FIG. 7, the switch 20 has an elongated body of a generally curved or arcuate shape to correspond and conform with the rounded corner 34 of the housing. The switch has an elongated outer user interface portion 100 with a friction inducing outer surface 101 (e.g., a plurality of parallel raised ridges 102) between two curved end portions 104 that conform with and hug the rounded corner 34. The outer surface 101 is adapted for contact with a user's thumb or finger for sliding the switch between the various positions.

The switch also has an inner elongated slider 106 with a two-ended ratchet 108 inward of the slider, and a neck portion 110 between and connecting the outer interface portion 100 and the inner slider 106. At the rounded corner 34, the housing 14 is formed with a rectangular opening 119 defined by a slightly recessed formation 120 in each housing half (FIG. 2c), through which the neck portion 110 extends. The switch 20 is sandwiched between the first and second housing halves 14a and 14b but it is slidable in a circumferential direction along the rounded corner 34. The recessed formation 120 is defined by inset segments 124 of the peripheral edge (see FIGS. 3 and 4) at the rounded corner 34 of the housing halves, which accommodate and conform with the curved end portions 104 of the interface portion 100 of the switch. The segments 124 are situated between the curved end portions 104 and the slider 106. As such, the interface portion 100 is outside of the housing and exposed, whereas the slider 106 and the ratchet 108 are inside the housing 14. The opening 119 in the housing is sufficiently elongated along the peripheral edge 40 so as not to interfere with the neck portion 110 as the switch 20 is moved between the three positions. The curved end portions 104 of the interface portion 100 are sufficiently elongated along the inset segments 124 such that the opening 119 is covered by the switch 20 in all three positions.

The slider 106 is also elongated along the segments 124 but it sits inside the segments 124. On an outwardly facing surface of the slider is at least one ridge formation 126 (FIG. 8) at or near each end of the slider. The ridge formations 126 are adapted for releasable engagement with grooves 128 formed in an inner surface of the segments 124 to releasably lock the switch 20 in each of the three positions. The segments 124, the interface portion 100 and the slider 106 have a curvature similar to each other, so that they have a conforming inconspicuous profile allowing the switch 20 to be moved into the three positions along the rounded corner of the housing member.

In the illustrated embodiment of FIG. 8, the interface portion 100 and the slider 106 have nearly the same length whereas the ratchet has a greater length. In the width dimension, the slider portion 106 has the greatest width, with the interface portion 100 having a lesser width and the ratchet 108 having the least width. As such, each of the interface portion 100 and the slider 106 sits in both housing halves 14a and 14b whereas the ratchet 108 sits primarily in the first housing half 14a.

The ratchet 108 has a mid-portion connected to the slider, and two opposing arms 130a, 130b, each with a free end with an inwardly facing tooth member 112a, 112b. Both arms have hinge formations 114a, 114b (e.g., transverse slices or cutouts) to provide flexibility. In the illustrated embodiment, the shorter arm 130a (to the left of the neck portion 110 in FIG. 8) has inwardly facing hinge formation 114a to facilitate outward flexure, and the longer arm 130b (to the right of the neck portion 110 in FIG. 8) has outwardly-facing hinge formations 114b to facilitate inward flexure. In that regard, it is understood that flexure (inwardly or outwardly) can be facilitated with either an inwardly-facing or outwardly-facing hinge formation. The tooth member 112b interacts with a one-way release cam 132. The tooth member 112a interacts with a locking cam 134. The one-way release cam 132 is formed as an inwardly facing protrusion on the inner surface of the housing half 14a, at an end 136 of the segment 124a. The locking cam 134 is formed as protrusion near an end 136 of the segment 124b, on the inner surface of the first housing half 14a projecting toward the second housing half 14b.

When the switch is moved into the "extend" position (FIG. 3c), a raised formation 140 provided on an outwardly facing surface of the ratchet arm 130b comes into contact with the one-way release cam 132 which bends the aim 130b inwardly as facilitated by the hinge(s) 114b so that the tooth member 112b engages a cog 76 on the reel 16. While the ratchet arm 130b is sufficiently rigid to remain engaged with the cog 76 and prevent rotation of the reel against the retraction bias of the spring coil 70, the ratchet aim 130b is hinged for outward flexure such that it is sufficiently flexible to release the cog and allow rotation of the reel when the user draws on the tensile member 18 to extend it from the housing member. Thus, when the switch 20 is in the "extend" position, the reel 16 is allowed extension rotation in one direction (namely, clockwise in FIG. 3c) but not retraction rotation in the opposite direction (namely, counterclockwise in FIG. 3c). As the user draws on the tensile member 18, a "clicking" sound is audible when the tooth member 112b slides over a series of cogs 76.

When the user moves the switch 20 to the "release" position (FIG. 3b), the raised formation 140 is moved out of contact with the one way release cam 132, whereupon the ratchet aim 130b elastically returns to its resting configuration and the tooth member 112b releases its engagement with the reel 16. The reel can then either retract the tensile member 18 under the biasing force of the coil spring 70 or be rotated in an opposite direction (namely, clockwise in FIG. 3b) when the user pulls on the tensile member 18 with a force sufficient to overcome the biasing force of the coil spring 70 to extend the tensile member.

When the user moves the switch 20 to the "locked" position (FIG. 3a), the opposite ratchet arm 130a comes into contact engagement with the locking cam 134 which exerts an inward force to bend the ratchet arm 130a such that the tooth member 112a engages a cog 76 on the reel 16. The inwardly facing hinge formation 114a allows the arm 130a to bend readily toward the reel 16 for a locking engagement between the tooth member 112a and the cog 76 that is intended to be releasable only when the switch 20 is moved out of the "locked" position. The locking engagement prevents the reel 16 from rotating in either direction and thus prevents the tensile member 18 from being extended or retracted. The locking cam 134 has a trapezoidal cross section and a contact surface 138 that is angled inwardly to push the tooth member 112a inwardly toward the cogs 76.

Notably, the switch 20 is adapted to remain in any selected position until moved by the user by means of the releasable engagement between the ridges 126 on the slider 106 and the indents 128 on the segments 124 of the peripheral edge of the housing halves. The switch 20 can be made of any suitable material that is sufficiently rigid yet flexible and elastic to enable the ratchet arms 130 to releasably interact with the cams 132, 134 and engage the reel 16. Plastics, such as acetal resins, are suitable materials.

Figure 9:
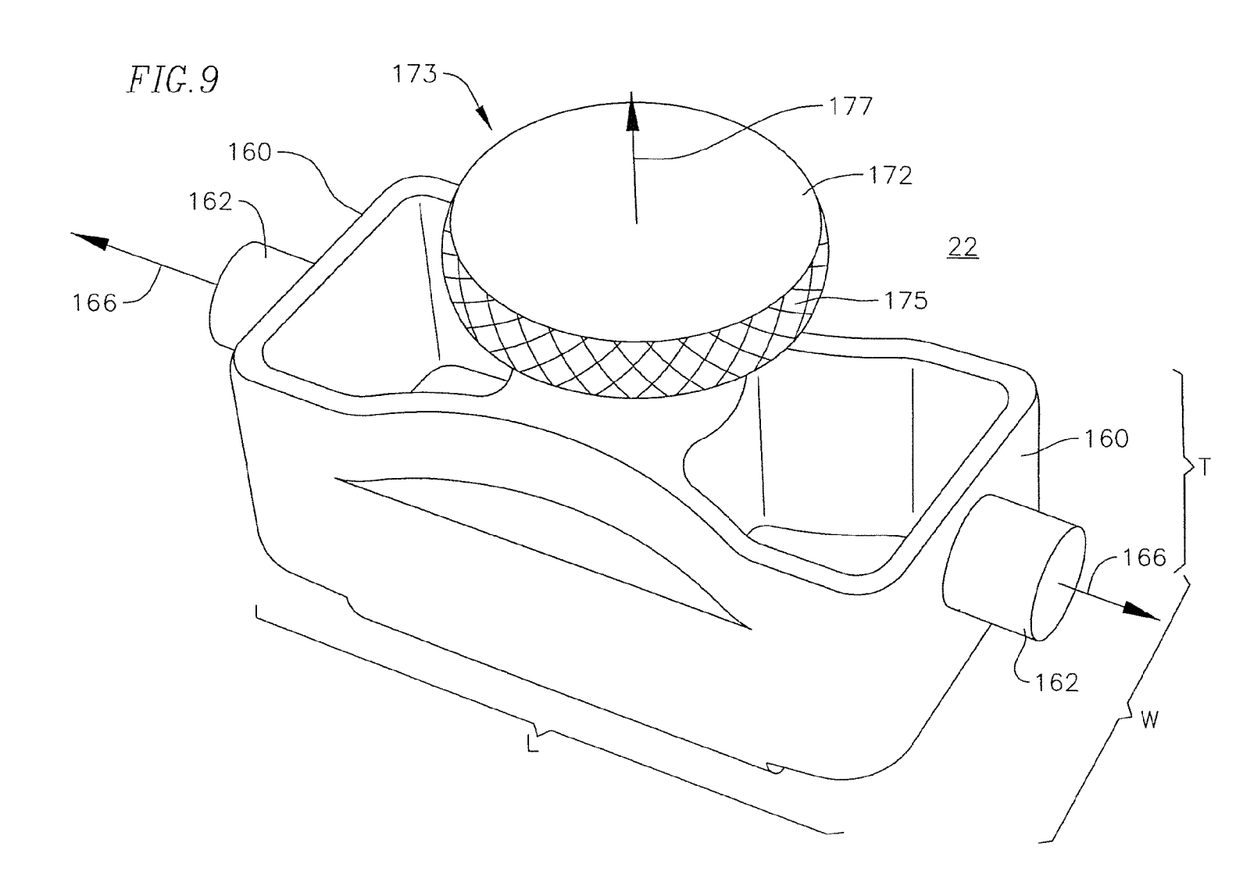
FIG. 9 is a bottom plan view of an embodiment of a swivel mounting member.
Figure 10:
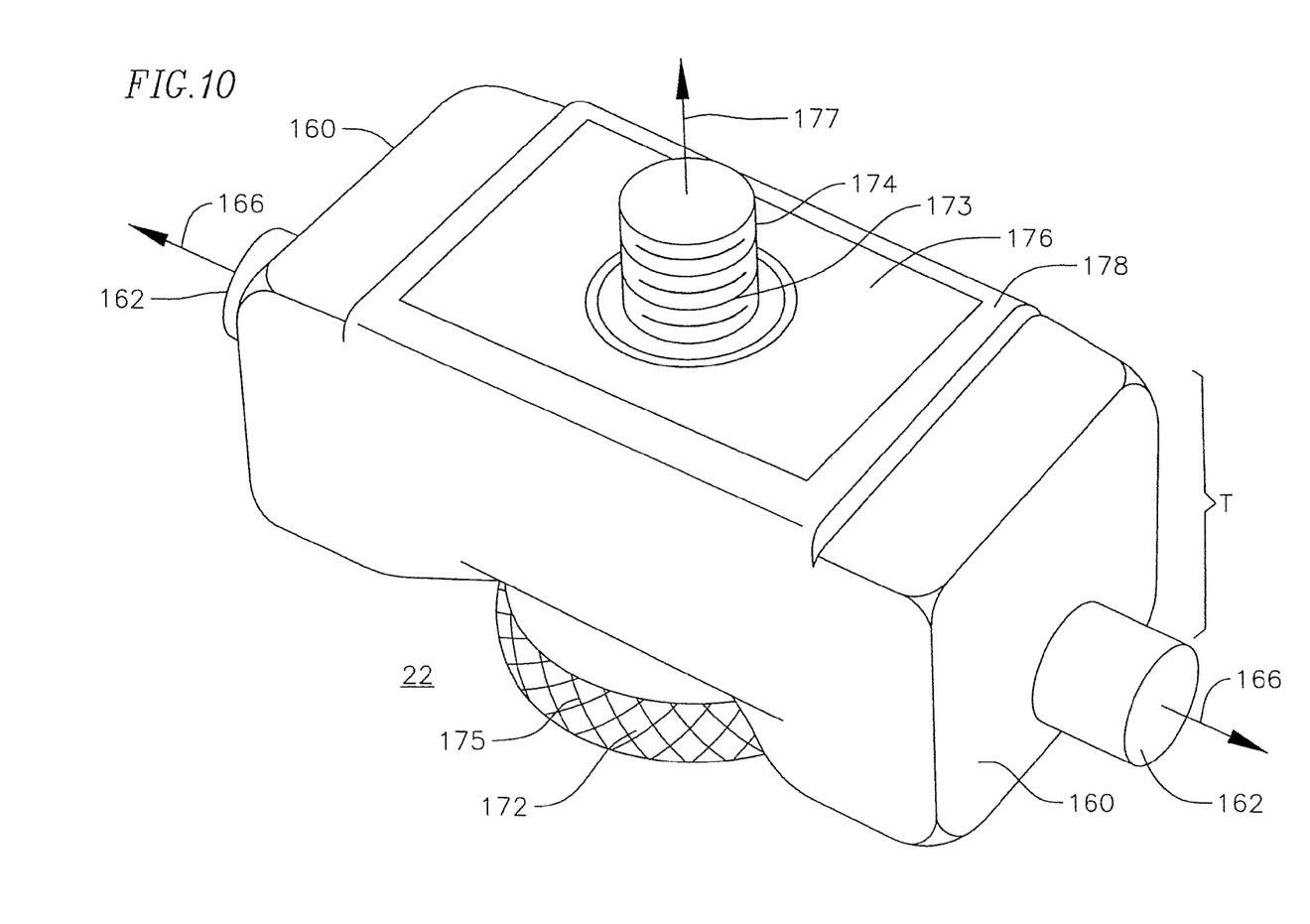
FIG. 10 is a top plan view of the swivel mounting member of FIG. 9.

With reference to FIGS. 2a, 9, 10, the swivel mounting member 22 has a generally elongated rectangular body with a length L, a width W and a thickness T. The swivel member is hollow (or six-sided in the disclosed embodiment) to reduce weight of the device. The swivel body has two ends 160 that face the arms 50 extending from the housing 14. On each of the ends is a cylindrical prong 162 that is received in a respective recess 164 (FIG. 2a) formed in the arms 50 in allowing a range of rotation relative to the housing 14. The prongs 162 thus define a first swivel axis 166 that is generally perpendicular to the longitudinal axis 31 of the housing 14.

Extending through the thickness T dimension of the swivel mounting member 22 at a mid-location along the length L of the member 22 is a mounting screw with a large head 172 having a friction-inducing circumferential contact surface 175 and a shaft 173 whose length is greater than the thickness of the member 22 so that a distal end 174 is exposed. The exposed distal end 174 is adapted to be received in a threaded tripod mounting hole provided on a bottom side of most conventional cameras. A cushion liner or pad 176 (FIG. 10) is provided on a distal contact surface 178 of the swivel mounting member which allows the screw 170 to be securely fastened to the camera 12 while enabling rotation of the swivel member 22 relative to the camera about the screw 170. Notably, the screw 170 defines a second rotational or swivel axis 177 that is advantageously perpendicular to and independent of the first rotational or swivel axis 160 defined by the prongs 162. Thus, the present device provides two independent axes of rotation between the device and the camera. In the disclosed embodiment, the device has a rotational range of 360 degrees about the axis 177 and a rotational range of about 180 degrees about the axis 166. These two axes of rotational minimize stress on the tensile member during deployment by allowing the tensile member to extend tangentially from the reel and housing to its anchored distal end whether the camera is used in the landscape or portrait orientation.

Figure 2B:
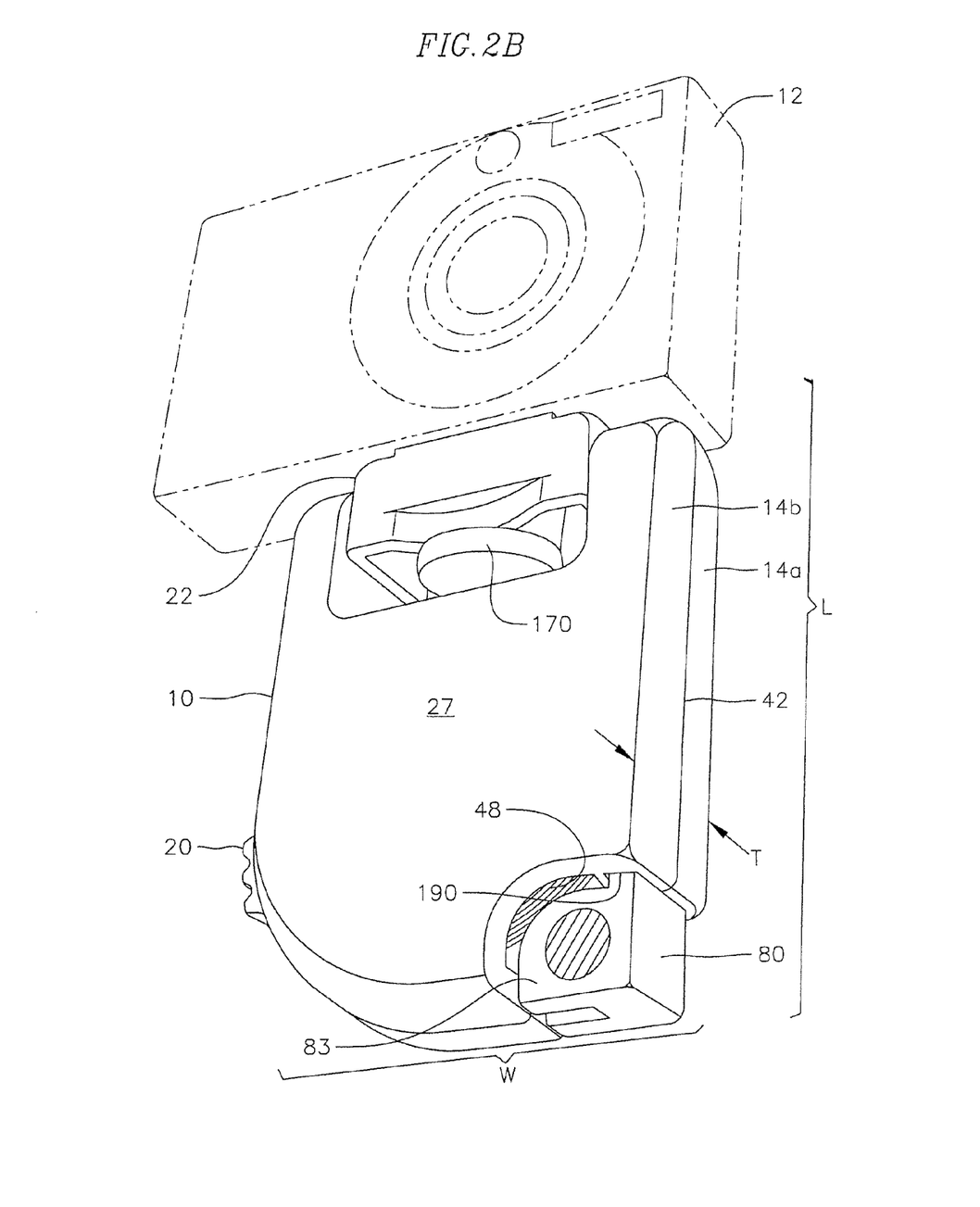
FIG. 2b is a perspective view of an embodiment of the device attached to a camera in a landscape orientation.

Used in the landscape orientation, the camera 12 can lie in a common plane with the device 10 (along with the mounting member 22 and the mounting screw 170), as shown in FIG. 2b. Moreover, the mounting screw 170 is parallel with the longitudinal axis 31 of the device. The slot opening 48 faces downwardly with the tensile member extending tangentially from the reel 16 and stretched downwardly with minimal, if any, stress imposed on the tensile member 18 as it extends tangentially from the reel toward the user's belt, shoes or feet in a linear path.

Figure 2C:
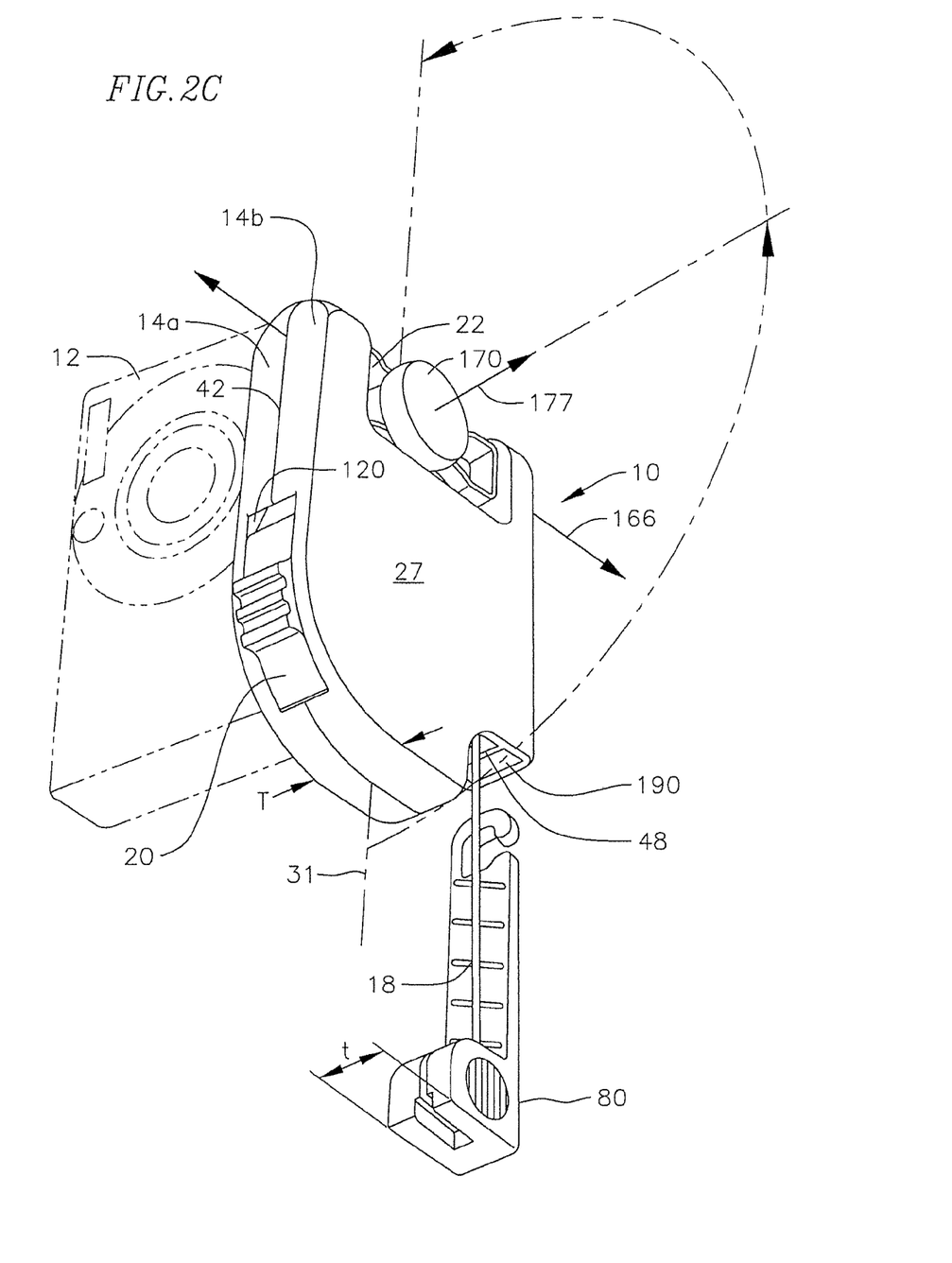
FIG. 2c is a perspective view of an embodiment of the device attached to a camera in a portrait orientation.
Figure 2D:
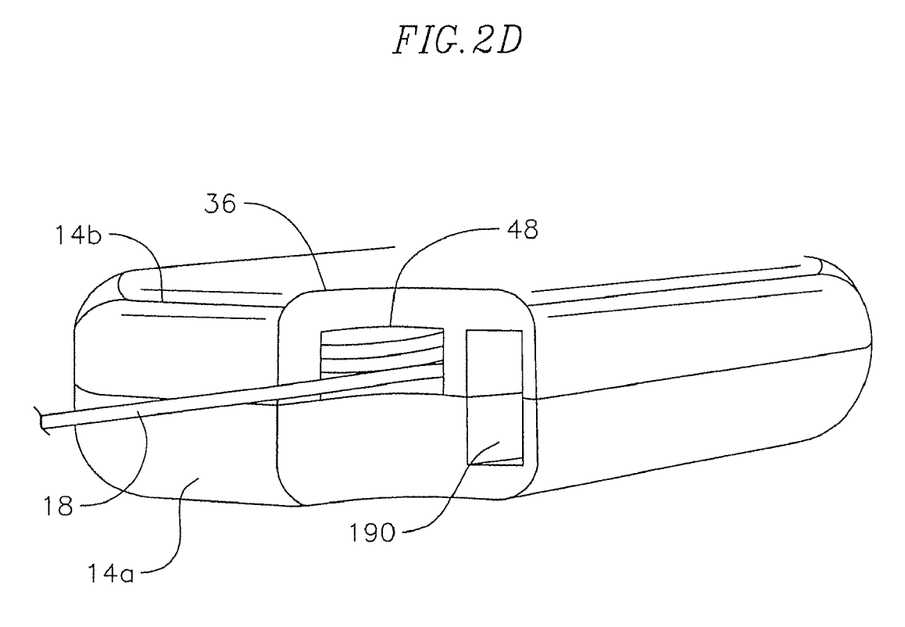
FIG. 2d is an end view of an embodiment of the device with a tensile member extending from the device.

Used in the portrait orientation, the camera 12 and the device 10 lie in perpendicular planes in that they are perpendicular to each other. Moreover, the housing 14 is perpendicular to the swivel mounting screw 170, as shown in FIG. 2c, in that the screw 170 is perpendicular to the longitudinal axis 31 of the device. However, the slot opening 48 remains facing downwardly with the tensile member 18 stretched downwardly as it extends tangentially from the reel 16 toward the user's belt, shoes or feet in a linear path. It is understood that the device may be rotated so that the switch 20 faces rearward (toward the user) as opposed to facing forward (toward the subject of the image to be taken by the camera).

Thus, regardless of the camera's orientation, the device 10 can be used in a manner by which the tensile member 18 can be deployed and pulled tautly without significant contact, rubbing or bending around any portion of the housing at the slot opening. The tensile member thus can remain free of kinks or bends that can otherwise lead to premature wear and tear on the tensile member or the housing. By providing two independent axes of rotation, the device can be easily maneuvered into deployment whether the user uses the camera in the landscape orientation or the portrait orientation.

To arrange the device between the landscape and portrait orientations of the camera, the screw 170 remains connected to the camera which the user can rotate the housing 14 about the axis 166 and rotate the housing 14 about the axis 177, as a single movement, or two separate movements in either sequence. Typically, transitioning from use with the camera in the landscape orientation to the portrait orientation, the device can be rotated 90 degrees about one axis, and 90 degrees about the other axis.

When the swivel mounting member 22 is not in use, it can be rotated about the axis 166 so that end of the mounting screw 174 is inserted and received in a threaded hole 179 to secure the swivel mounting member 22 in a stored configuration. To deploy the swivel mounting member 22, the screw 170 is rotated so that its end 174 is withdrawn from the threaded hole 179 and the member 22 is rotated 180 degrees about axis 166 so that the screw end faces outward and can be inserted into a tripod mounting hole of the camera.

When the tab member 80 is not in use, it is safely stored in the interior of the housing 14. Adjacent the opening 48 is channel 190 that lies along the side 32 of the housing and extends into the arm 50. As seen in FIGS. 3 and 4, the channel 190 is formed from opposing slots 192 configured in the inner surface of housing halves 14a and 14b. As the tab member 80 allows for a range of rotation of about 180 degrees relative to the tensile member 18, the tab member 80 and the tensile member 18 can be folded or otherwise collapsed on each for the tab member 80 to be inserted distal end first into the channel 190. As shown in FIG. 2b, the enlarged end 83 of the tab member 80 is advantageously configured to fill in the indented corner 36 of the housing 14 to provide a more complete profile to the device 10 when the tab member 80 is in the stored configuration. The enlarged end 83 also has a thinner dimension t than the thickness T of the housing to draw attention to the tab member 80 and facilitate deployment of the tab member from the channel 190. To deploy the tab member, the user pulls on the enlarged end 83 and pulls the tab member from the channel 190. The tab member can be stepped by the user on or hooked to the user's body, such as her shoes, belt, belt loop, button hole and the like, or even a nearby object.

It is understood that the camera and the device can be arranged in any configuration permitted by the two independent rotational axes and are not limited to those illustrated herein. While axis 177 provides a 360 degree rotation, the user need not ever utilize this full range of rotation.

The preceding description has been presented with reference to certain exemplary embodiments of the invention. Workers skilled in the art and technology to which this invention pertains will appreciate that alterations and changes to the described structure may be practiced without meaningfully departing from the principal, spirit and scope of this invention. It is understood that the drawings are not necessarily to scale. Accordingly, the foregoing description should not be read as pertaining only to the precise structures described and illustrated in the accompanying drawings. Rather, it should be read as consistent with and as support for the following claims which are to have their fullest and fairest scope.

What is claimed is:

1. A portable camera steadying device for use with a camera, comprising:
   a housing;
   a reel inside the housing,
   a tensile member carried on the reel, the tensile member having a proximal end and a distal end, the housing having an opening through which the tensile member extends;
   a swivel tab member connected to the distal end of the tensile member;

a swivel mounting member adapted to attach the device to the camera, the swivel mounting member providing two independent axes of rotation between the housing and the camera; and a switch adapted to control rotation of the reel, wherein the swivel tab member is configured to adopt a deployed position outside of the housing and a stored position wherein at least a portion of the tab member is inside the housing.

2. The device of claim 1, wherein the switch is adapted to at least releasably lock the reel against rotation in one direction.

3. The device of claim 1, wherein the switch is adapted to at least releasably lock the reel against rotation in any direction.

4. The device of claim 1, wherein the reel includes a spring coil biasing rotation of the reel in one direction.

5. The device of claim 4, wherein the switch is adapted to at least releasably lock the reel against rotation as biased by the spring coil.

6. The device of claim 1, wherein the two independent axes of rotation are generally perpendicular to each other.

7. The device of claim 1, wherein the tensile member extends tangentially from the reel through the opening in a linear path to the swivel tab member in the deployed position while the camera is used in a landscape orientation.

8. The device of claim 7, wherein the camera and the device are in planar alignment.

9. The device of claim 1, wherein the tensile member extends tangentially from the reel through the opening in a linear path to the swivel tab member in the deployed position while the camera is used in the portrait orientation.

10. A portable camera steady device for use with a camera, comprising:

a housing with two arms;

a reel inside the housing;

a tensile member carried on the reel;

a swivel mounting member extending between the two arms and adapted for axial rotation about an axis extending between the two arms, the swivel mounting member having a screw adapted to secure the swivel mounting member to the camera, wherein the screw is configured to support the camera in plane with the swivel mounting member when the camera and the device are in a first configuration and to support the camera perpendicularly to the swivel mounting member when the camera and the device are in a second configuration, wherein the swivel mounting member is configured to support the camera in plane with the housing when the device and the camera are in the first configuration and to support the camera perpendicularly to the housing when the device and the camera are in the second configuration, and wherein the camera and the device are attached to each other in the first, and second configurations and during transition therebetween.

11. The device of claim 10, wherein the swivel mounting member has an elongated body with two ends, each end having a prong, and the prongs define the axis of axial rotation.

12. The device of claim 10, wherein the camera is in landscape orientation in the first configuration.

13. The device of claim 10, wherein the camera is in portrait orientation in the second configuration.

14. The device of claim 10, wherein the tensile member has a proximal end and a distal end, the housing having an opening through which the tensile member extends.

15. The device of claim 10, further comprising a switch adapted to control rotation of the reel.

16. The device of claim 10, further comprising a swivel tab member connected to the distal end of the tensile member.

17. The device of claim 16, wherein the housing has a channel adapted to receive at least a portion of the swivel tab member.

18. The device of claim 16, wherein the swivel tab member includes a swivel attachment attaching a distal end of the tensile member to the swivel tab member.

19. The device of claim 16, wherein the swivel tab member has an open hook formation.

20. The device of claim 10, wherein the swivel mounting member is adapted for axial rotation about the axis between a deployed position and a storage position.

* * * * *